Sept. 17, 1929.  G. H. BREKKE  1,728,472
INTERNAL COMBUSTION ENGINE
Filed Sept. 6, 1927

INVENTOR
GUSTAVE H. BREKKE
BY Munn & Co.
ATTORNEYS.

Patented Sept. 17, 1929

1,728,472

UNITED STATES PATENT OFFICE

GUSTAVE H. BREKKE, OF BERKELEY, CALIFORNIA

INTERNAL-COMBUSTION ENGINE

Application filed September 6, 1927. Serial No. 217,769.

My invention relates to improvements in internal combustion engines and it consists in the combinations, constructions, and arrangements hereinafter described and claimed.

An object of my invention is to provide means for directing a new charge of gas into a cylinder in such a manner as to cause this charge to force the exhaust gases out of the cylinder without mixing with them. In this way the new charge is not wasted by becoming partially mixed with the exhaust gases and being exploded with the latter.

A further object of my invention is to provide a device of the type described in which the new gases forms a layer adjacent to the top of the piston which layer grows quickly thicker so as to uniformly push the exploded gases from the cylinder thereby preventing the mixing of the new gases with the exhaust gases.

Other objects and advantages will appear in the following specification, and the novel features of my invention will be particularly pointed out in the appended claims.

My invention is illustrated in the accompanying drawing forming a part of this application, in which.

Figure 1:
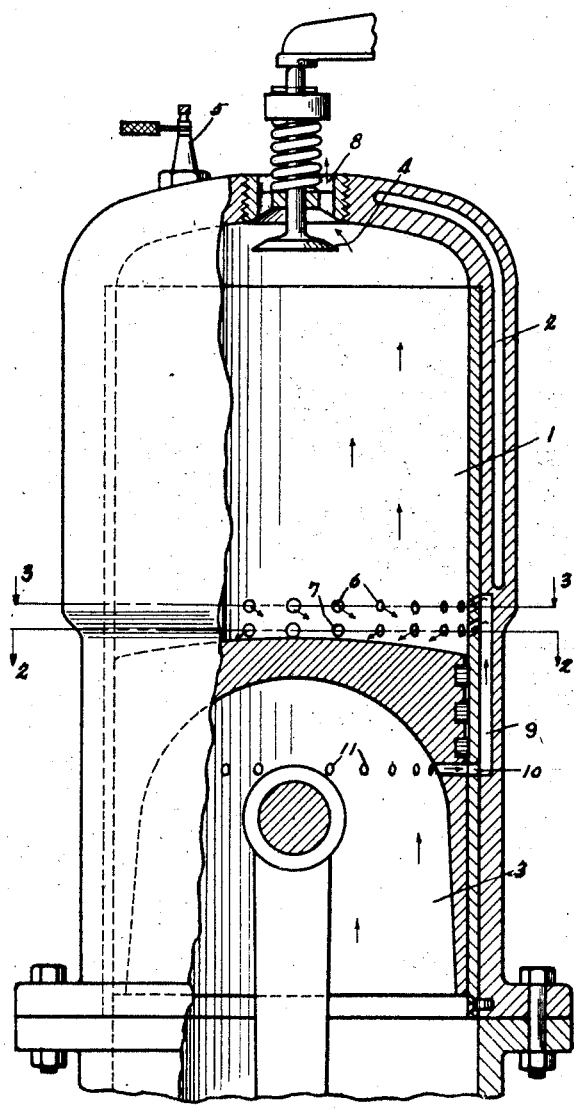
Figure 1 is a side elevation of the device, a portion thereof being shown in section for clarity.

In carrying out my invention I provide a cylinder 1 which may be cooled by water disposed in a water jacket 2 if desired. A piston 3 is slidably mounted in the cylinder 1 in the usual manner. An exhaust valve 4 communicates with the cylinder as shown. The gases within the cylinder are ignited by a spark plug 5.

Figure 2:
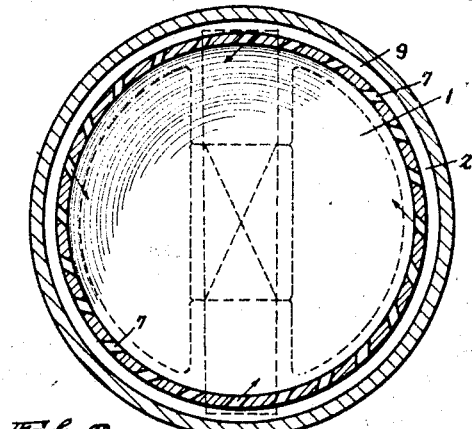
Figure 2 is a section along the line 2—2 of Figure 1.
Figure 3:
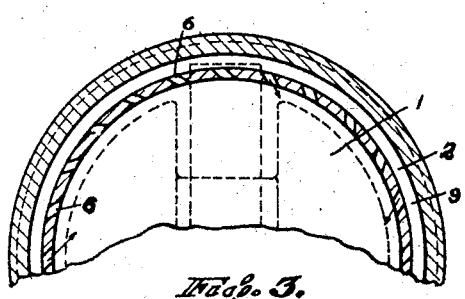
Figure 3 is a section along the line 3—3 of Figure 1.

It will be noted from Figure 1 that the cylinder is provided with two rows of openings 6 and 7 which are inclined downwardly so as to direct gas flowing therethrough in a downward direction onto the top of the piston 3. In addition to this downward inclination of the openings 6 and 7, the row of openings 6 are inclined so as to direct the gases at an angle with respect to radii extending from the center of the piston 3. The openings 7 (see Figure 2) extend at an opposite angle to that of the openings 6. This construction causes the gases flowing from the openings 6 and 7 to cross each other and to form a blanket of gas which quickly thickens so as to finally fill the entire interior of the cylinder 1. I have found that this issuing of the gases at angles crossing each other forms a layer within the cylinder, which will not mix with the exhaust gases but will drive the exhaust gases out through the exhaust port 8 even though not mixing with them.

The means for forcing the new gases into the portion of the cylinder which disposed above the piston 3 comprises a plurality of ducts 9 which communicate with the openings 6 and 7 and with openings 10 in the cylinder wall 1. The piston has a number of openings 11 therein which are aligned with the openings 10 when the piston reaches its lowermost position. The new gas is under compression beneath the piston 3 and will flow through the openings 11 and 10 as soon as these openings are brought into alignment with each other.

From the foregoing description of the device, the operation thereof may be readily understood.

The piston acts as a valve for controlling the flow of new gases through the cylinder. In addition to this the openings 6 and 7 direct the new gas into the cylinder in such a manner as to prevent the mixing of these gases with the exhaust gases. This point has already been clearly set forth. The device is extremely simple in construction and provides novel means for causing the new gases to act as an ejector for the burnt gases yet at the same time preventing the mixing of the two gases.

The device is also adapted to be used on Diesel engines for scavenging the burnt gases.

I claim:

1. In a device of the type described, a cylinder having a plurality of rows of gas inlet openings formed therein, the openings in one row being inclined with respect to the openings in an adjacent row, all of said rows of openings being inclined with respect to radii of said cylinder.

2. In a device of the type described, a cylinder having a plurality of rows of gas inlet openings formed therein, the openings in one row being inclined with respect to the openings in an adjacent row, said rows of openings forming said gas into layers, each of said layers being whirled in the opposite direction with respect to the adjacent layer.

3. In a device of the type described, a cylinder, a piston slidably disposed in said cylinder, said cylinder having a plurality of rows of gas inlet openings formed therein, the openings in one row being inclined with respect to the openings in an adjacent row, said openings being inclined downwardly for directing the gases against said piston.

GUSTAVE H. BREKKE.